United States Patent
Luo et al.

(10) Patent No.: US 12,052,725 B2
(45) Date of Patent: *Jul. 30, 2024

(54) ADAPTIVE WAVEFORM SELECTION IN WIRELESS COMMUNICATIONS

(71) Applicant: QUALCOMM Incorporated, San Diego, CA (US)

(72) Inventors: Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,682

(22) Filed: Sep. 14, 2021

(65) Prior Publication Data

US 2022/0070916 A1     Mar. 3, 2022

Related U.S. Application Data

(63) Continuation of application No. 16/551,281, filed on Aug. 26, 2019, now Pat. No. 11,122,614, which is a
(Continued)

(51) Int. Cl.
*H04W 72/23*     (2023.01)
*H04B 7/26*      (2006.01)
(Continued)

(52) U.S. Cl.
CPC ......... *H04W 72/23* (2023.01); *H04L 27/0008* (2013.01); *H04L 27/2623* (2013.01);
(Continued)

(58) Field of Classification Search
CPC ............... H04W 72/14; H04W 74/006; H04W 74/0833; H04L 27/0008; H04L 27/2623;
(Continued)

(56) References Cited

U.S. PATENT DOCUMENTS 6,069,913 A     5/2000   Suominen
8,300,533 B2   10/2012   Malladi et al.
(Continued)

FOREIGN PATENT DOCUMENTS

CN     101087169 A    12/2007
CN     101730981 A     6/2010
(Continued)

OTHER PUBLICATIONS

3GPP TS 36.300: "3rd Generation Partnership Project; Technical Specification Group Radio Access Network; Evolved Universal Terrestrial Radio Access (EUTRA) and Evolved Universal Terrestrial Radio Access Network (EUTRAN); Overall Description; Stage 2 (Release 13)", 3GPP Standard; vol. RAN WG2, No. V13.4.0 (Jun. 2016), pp. 1-314, Jul. 7, 2016 (Jul. 7, 2016), XP051123307 [retrieved on Jul. 7, 2016].

(Continued)

*Primary Examiner* — Ayaz R Sheikh
*Assistant Examiner* — Tarell A Hampton
(74) *Attorney, Agent, or Firm* — QUALCOMM IP DEPT.; James Hunt Yancey, Jr.

(57)     ABSTRACT

Systems and methods of wireless communication in which wireless devices are adapted to implement adaptive waveform selection are disclosed. For example, operation according to embodiments may provide for use of a waveform design that minimizes peak-to-average power ratio (PAPR), such as single-carrier frequency division multiplexing (SC-FDM), as well as a waveform design that provides higher spectral efficiency, such as orthogonal frequency division multiplexing (OFDM), for scenarios that are not power-limited and the higher PAPR is acceptable. Adaptive waveform selection may be based implicitly on one or more parameters or may be based on explicit signaling. Adaptive waveform selection may be utilized with respect to initially (Continued)

establishing a communication link and/or with respect to an established communication link.

18 Claims, 3 Drawing Sheets

Related U.S. Application Data continuation of application No. 15/359,226, filed on Nov. 22, 2016, now Pat. No. 10,397,947.

(60) Provisional application No. 62/374,473, filed on Aug. 12, 2016.

(51) Int. Cl.
| | | |
|---|---|---|
| *H04L 27/00* | (2006.01) | |
| *H04L 27/26* | (2006.01) | |
| *H04W 74/00* | (2009.01) | |
| *H04W 74/0833* | (2024.01) | |

(52) U.S. Cl.
CPC ...... *H04L 27/2636* (2013.01); *H04L 27/2646* (2013.01); *H04W 74/006* (2013.01); *H04B 7/2621* (2013.01); *H04L 27/2601* (2013.01); *H04W 74/0833* (2013.01); *Y02D 30/70* (2020.08)

(58) Field of Classification Search
CPC ............. H04L 27/2636; H04L 27/2646; H04L 27/2601; H04B 7/2621; Y02D 30/70
See application file for complete search history.

(56) References Cited

U.S. PATENT DOCUMENTS

| | | | |
|---|---|---|---|
| 8,655,396 | B2 | 2/2014 | Malladi et al. |
| 8,913,672 | B2 | 12/2014 | Luo et al. |
| 9,762,441 | B2 | 9/2017 | Kayargadde et al. |
| 10,397,947 | B2 | 8/2019 | Luo et al. |
| 11,122,614 | B2 | 9/2021 | Luo et al. |
| 2003/0003913 | A1 | 1/2003 | Chen et al. |
| 2007/0195690 | A1 | 8/2007 | Bhushan et al. |
| 2009/0180428 | A1 | 7/2009 | Viswanath |
| 2010/0091919 | A1 | 4/2010 | Xu et al. |
| 2010/0118810 | A1 | 5/2010 | Qu et al. |
| 2010/0142455 | A1 | 6/2010 | Imamura |
| 2010/0189071 | A1 | 7/2010 | Kitazoe |
| 2010/0255847 | A1 | 10/2010 | Lee et al. |
| 2010/0275086 | A1 | 10/2010 | Bergquist et al. |
| 2010/0322174 | A1 | 12/2010 | Ji et al. |
| 2011/0069653 | A1 | 3/2011 | Wang et al. |
| 2011/0200071 | A1* | 8/2011 | Hamaguchi ............ H04B 7/068 375/267 |
| 2011/0235604 | A1 | 9/2011 | Inoue et al. |
| 2012/0008575 | A1* | 1/2012 | Vujcic ................. H04W 74/002 370/329 |
| 2012/0314672 | A1 | 12/2012 | Chen |
| 2013/0044592 | A1 | 2/2013 | Kim et al. |
| 2013/0244679 | A1* | 9/2013 | Anbe .................... H04W 72/56 455/452.1 |
| 2014/0105152 | A1 | 4/2014 | Wu et al. |
| 2014/0146754 | A1 | 5/2014 | Bayesteh et al. |
| 2014/0269579 | A1 | 9/2014 | Xu et al. |
| 2014/0293987 | A1 | 10/2014 | Zhu et al. |
| 2014/0334389 | A1 | 11/2014 | Abdel-Samad et al. |
| 2015/0043540 | A1 | 2/2015 | Nikopour et al. |
| 2015/0049712 | A1 | 2/2015 | Chen et al. |
| 2015/0092528 | A1 | 4/2015 | Luo et al. |
| 2015/0195069 | A1 | 7/2015 | Yi et al. |
| 2015/0282008 | A1 | 10/2015 | Cao et al. |
| 2015/0365880 | A1 | 12/2015 | Malladi et al. |
| 2016/0205680 | A1 | 7/2016 | Nguyen et al. |
| 2017/0127435 | A1 | 5/2017 | Rong et al. |
| 2018/0077722 | A1 | 3/2018 | Awad et al. |

FOREIGN PATENT DOCUMENTS

| | | |
|---|---|---|
| CN | 101826907 A | 9/2010 |
| CN | 105814835 A | 7/2016 |
| EP | 2259654 A1 | 12/2010 |
| EP | 2320704 A1 | 5/2011 |
| EP | 2557879 A1 | 2/2013 |
| JP | 2007151059 A | 6/2007 |
| JP | 2010233095 A | 10/2010 |
| WO | WO-2008042889 A1 | 4/2008 |
| WO | WO-2008045781 A1 | 4/2008 |
| WO | WO-2008057969 A2 | 5/2008 |
| WO | WO-2008058143 A2 | 5/2008 |
| WO | WO-2009020930 | 2/2009 |
| WO | WO-2009060324 A1 | 5/2009 |
| WO | WO-2010030941 A2 | 3/2010 |
| WO | WO-2010032815 A1 | 3/2010 |
| WO | WO-2010067766 A1 | 6/2010 |
| WO | WO-2010068866 A2 | 6/2010 |
| WO | WO-2016018079 A1 | 2/2016 |

OTHER PUBLICATIONS

Berardinelli G., "Precoded Multirank Transmission with Linear Receiver for LTE-A Uplink", (2009 IEEE 70th Vehicular Technology Conference Fall), Jan. 12, 2009.

Su H.., et al., "OFDM/OQAM System Adapt to Waveform Design and Multiple Access", Journal of Electronics and Information, May 15, 2012.

India First Examination Report (FER) for Application No. 201947000688, mailing date of Jun. 28, 2021, 6 pages. Applicant provides India FER.

International Search Report and Written Opinion—PCT/US2017/041359—ISA/EPO—Oct. 27, 2017.

"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.2.0 Release 8); ETSI TS 136 300" ETSI Standards, LIS, Sophia Antipolis Cedex, France, vol. 3-R2, No. V8.2.0, Oct. 1, 2007 (Oct. 1, 2007), XP014040285 ISSN: 0000-0001 the whole document.

European Search Report—EP23180111—Search Authority—Berlin—Sep. 18, 2023.

* cited by examiner

ADAPTIVE WAVEFORM SELECTION IN WIRELESS COMMUNICATIONS

CROSS-REFERENCE TO RELATED APPLICATIONS

This application is a continuation of U.S. patent application Ser. No. 16/551,281, entitled, "ADAPTIVE WAVEFORM SELECTION IN WIRELESS COMMUNICATION", filed on Aug. 26, 2019, which is a continuation of U.S. patent application Ser. No. 15/359,226, entitled, "ADAPTIVE WAVEFORM SELECTION IN WIRELESS COMMUNICATION", filed on Nov. 22, 2016, and claims the benefit of U.S. Provisional Patent Application No. 62/374,473, entitled, "ADAPTIVE WAVEFORM SELECTION IN WIRELESS COMMUNICATIONS," filed on Aug. 12, 2016, the disclosures of which are hereby incorporated by reference herein in their entirety as if fully set forth below and for all applicable purposes.

TECHNICAL FIELD

Aspects relate generally to wireless communication systems, and more particularly, to adaptive waveform selection in wireless communication systems. Certain embodiments of the technology discussed below can implement adaptive waveform selection, such as to provide dynamic selection between use of SC-FDM and OFDM for the communication signals transmitted by one or more wireless devices, to use a most efficient waveform for communication.

Introduction

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Attention has been given to utilizing higher frequency carriers for enabling higher data rate communications (e.g., gigabit data rates) due to the availability of large amounts of bandwidth in the higher frequencies. In particular, millimeter-wave wireless communication systems (e.g., operating at 28 GHz, 60 GHz, and greater) have the potential of providing much higher data rates compared to systems operating in the sub-6 GHz frequencies. Moreover, there remains availability of large contiguous spectrum in these bands in many regions and jurisdictions.

The use of high frequency carriers, such as millimeter-wave, in wireless communication systems is not, however, without challenges. For example, millimeter-wave communications suffer from very high attenuation of the transmitted signal as compared with sub-6 GHz signal transmissions. Moreover, millimeter-wave signals are highly susceptible to blockage (e.g., due to obstacles, such as buildings, foliage, terrain, etc., in the signal path) due to the small wavelength of the signals.

Although beamforming might be performed (e.g., at Tx and/or Rx antennas) in an attempt to mitigate the signal attenuation or to provide directional beams in order to best utilize the channel, the use of beamforming with respect to high frequency carriers (e.g., millimeter-wave) in some wireless communication systems (e.g., many cellular communication system configurations) presents its own challenges. For example, the unique challenges of heavy path-loss faced by millimeter-wave systems suggests techniques such as analog beamforming. However, the use of several wideband power amplifiers in a system implementing analog beamforming techniques can introduce issues with respect to the communication system signals, such as issues regarding peak-to-average power ratio (PAPR), spectral efficiency, etc.

Accordingly, embodiments of wireless communication devices herein are adapted to implement adaptive waveform selection, such as to provide dynamic selection between use of SC-FDM and OFDM, for the communication signals transmitted by the wireless communication devices. For example, operation according to embodiments provides for use of a waveform design that minimizes PAPR, such as SC-FDM, as well as a waveform design that provides higher spectral efficiency, such as OFDM, for scenarios that are not power-limited and higher PAPR is acceptable.

In an aspect of the disclosure, a method for adaptive waveform selection for signal transmission in a wireless communication system is provided. For example, a method can include analyzing, by a wireless device of the wireless communication system, one or more parameters of a wireless communication scheduling grant. The method can further include selecting a waveform from a plurality of waveforms for the signal transmission based on analyzing one or more parameters of the wireless communication scheduling grant.

In an additional aspect of the disclosure, an apparatus for adaptive waveform selection for signal transmission in a wireless communication system is provided. The apparatus can include means for analyzing, by a wireless device of the wireless communication system, one or more parameters of a wireless communication scheduling grant. The apparatus can further include means for selecting a waveform from a plurality of waveforms for the signal transmission based on analyzing one or more parameters of the wireless communication scheduling grant.

In an additional aspect of the disclosure, a non-transitory computer-readable medium having program code recorded thereon is provided. The program code can include code for causing one or more computers to analyze one or more parameters of a wireless communication scheduling grant. The program code can further include code for causing one or more computers to select a waveform from a plurality of waveforms for the signal transmission based on analyzing one or more parameters of the wireless communication scheduling grant.

In an additional aspect of the disclosure, an apparatus for adaptive waveform selection for signal transmission in a wireless communication system is provided. The apparatus includes at least one processor, and a memory coupled to the processor. The at least one processor can be configured to analyze one or more parameters of a wireless communication scheduling grant. The at least one processor can further be configured to select a waveform from a plurality of waveforms for the signal transmission based on analyzing one or more parameters of the wireless communication scheduling grant.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably according to the particular context.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Figure 1:
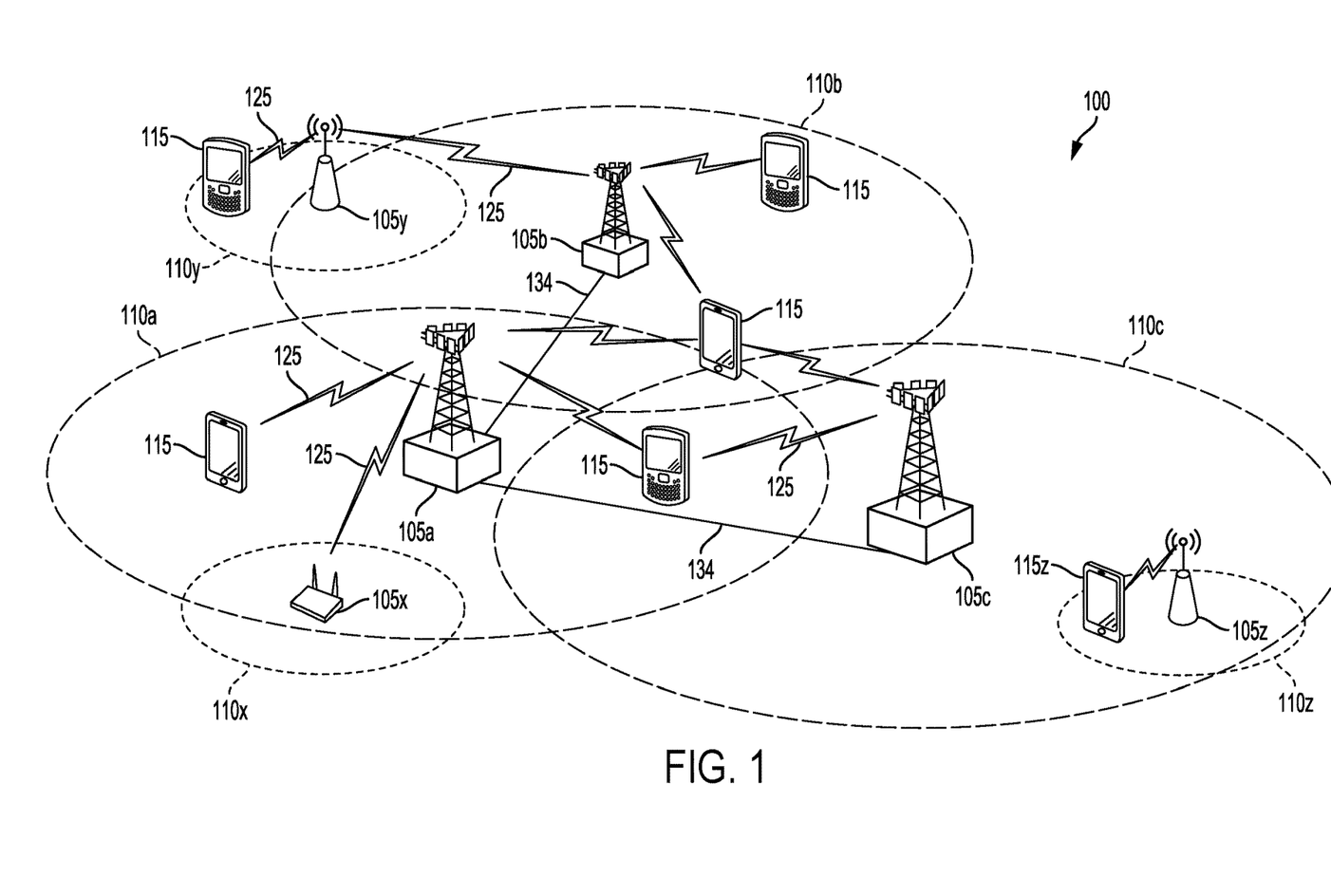
FIG. 1 is a block diagram illustrating details of a wireless communication system according to some embodiments of the present disclosure.

FIG. 1 shows a wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation networks. As appreciated by those skilled in the art, components appearing in FIG. 1 are likely to have related counterparts in other network arrangements.

Turning back to FIG. 1, the wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of the UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as the UEs 115, may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Although the backhaul communication 134 is illustrated as wired backhaul communications that may occur between eNBs, it should be appreciated that backhaul communications may additionally or alternatively be provided by wireless communications.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
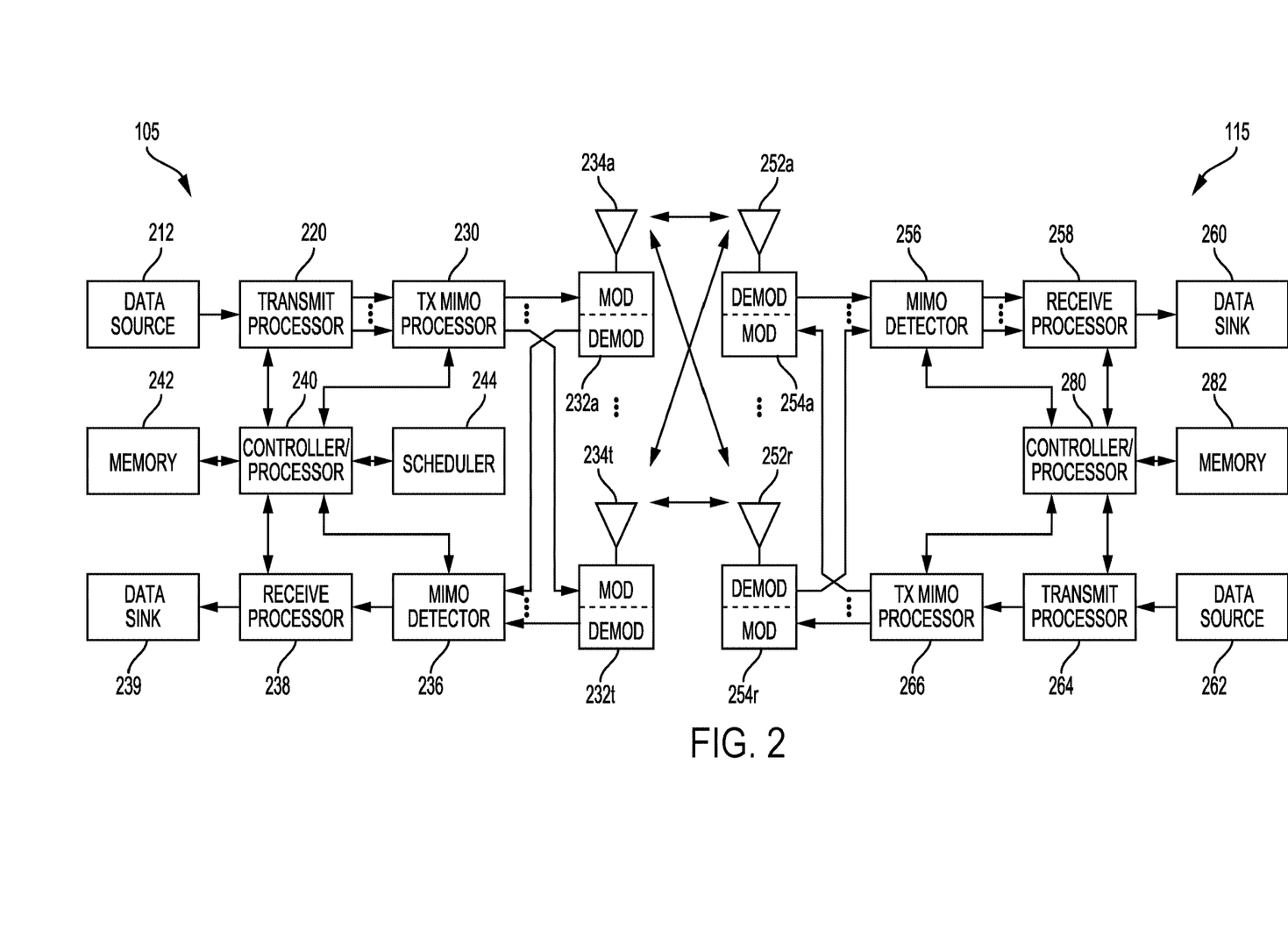
FIG. 2 is a block diagram conceptually illustrating a design of a base station/eNB and a UE configured according to some embodiments of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 provides a communication interface, as may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 provides a communication interface as may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the eNB 105 and the UE 115, respectively. A scheduler 244 may schedule UEs for data transmission on the downlink and/or uplink.

Referring again to FIG. 1, in operation according to aspects of the disclosure, various of the communication devices (e.g., one or more of eNBs 105 and/or UEs 115) of wireless network 100 are adapted to utilize high frequency carriers, such as millimeter-wave (e.g., one or more frequency band within 28 GHz-300 GHz), for implementing wireless communications. Circuitry of the communication devices participating in such high frequency communications may implement beamforming with respect to the high frequency wireless signals, such as to accommodate signal attenuation associated with the use of high frequency carriers, to facilitate increased channel capacity, to avoid or mitigate interference, etc. For example, one of eNBs 105 may implement beamforming with respect to signal transmissions (i.e., downlink transmission beamforming) and/or receiving signals (i.e., uplink receiving beamforming). Additionally or alternatively, one or more of UEs 115 may implement beamforming with respect to signal transmissions (i.e., uplink transmission beamforming) and/or receiving signals (i.e., downlink receiving beamforming).

As mentioned above, beamforming can be utilized in varying manners. For example, signal transmission beamforming may be provided through MIMO processor 230 performing precoding (e.g., under control of controller/processor 240) on signals to be transmitted by eNB 105 (e.g., downlink signals) and/or MIMO processor 266 performing precoding (e.g., under control of controller/processor 280) on signals to be transmitted by UE 115 (e.g., uplink signals). Similarly, receive beamforming may be provided through MIMO detector 236 performing spatial decoding (e.g., under control of controller/processor 240) on signals received by eNB 105 (e.g., uplink signals) and/or MIMO detector 266 performing spatial decoding (e.g., under control of controller/processor 280) on signals received by UE 115 (e.g., downlink signals).

Embodiments of eNBs 105 and/or UEs 115 implement analog beamforming, such as to address heavy path-loss associated with the use of high frequency carriers. Accordingly, the aforementioned transmission beamforming may be provided through MIMO processor 230 utilizing a beamforming network (e.g., Butler matrix, network of phase shifters and attenuators, etc.) providing relative phase shift and signal power weighting (e.g., under control of controller/processor 240) with respect to the signals provided to the antenna elements of antennas 234a through 234t to be transmitted by eNB 105 (e.g., downlink signals) and/or MIMO processor 266 utilizing a beamforming network providing relative phase shift and signal power weighting (e.g., under control of controller/processor 280) with respect to the signals provided to the antenna elements of antennas 252a through 252r to be transmitted by UE 115 (e.g., uplink signals). Similarly, receive beamforming may be provided through MIMO detector 236 utilizing a beamforming network providing relative phase shift and signal power weighting (e.g., under control of controller/processor 240) with respect to the signals provided by the antenna elements of antennas 234a through 234t received by eNB 105 (e.g., uplink signals) and/or MIMO detector 256 utilizing a beamforming network providing relative phase shift and signal power weighting (e.g., under control of controller/processor 280) with respect to the signals provided by the antenna elements of antennas 252a through 252r received by UE 115 (e.g., downlink signals).

Use of analog beamforming techniques may include the use of several wideband power amplifiers (e.g., transmit power amplifiers of MIMO processors 230 and/or 266). In a multicarrier system, if each component carrier goes through a separate power amplifier (PA), then the peak-to-average power ratio (PAPR) need be considered only on a per-carrier basis. However, especially in high frequency (e.g., millimeter-wave) systems, where several PAs are needed to facilitate analog beamforming, a common PA may be utilized for a plurality of the component carriers (e.g., all component carriers), and thus the PAPR of the combined waveform from all carriers should be considered.

The PAPR advantage of SC-FDM over OFDM reduces as the number of component carriers increases. This is because the carriers may not be contiguous, and even if the carriers are contiguous, the Discrete Fourier Transform-spreading (DFT-spreading) operation does not span multiple carriers to avoid prohibitively large DFT-size. Similarly, if MIMO operation is allowed with non-diagonal precoding, the combining of the MIMO layers erodes the PAPR advantage of SC-FDM. On the other hand, the link performance advantage of OFDM over SC-FDM is higher at high signal-to-noise ratio (SNR) and lower at low SNR.

Accordingly, in accordance with aspects of the disclosure, devices of wireless network 100 are adapted to implement adaptive waveform selection. Selection in dynamic fashion enables real-time adjustments based on real-time operating circumstances. In some scenarios, adaptive waveform selection includes dynamic selection between use of SC-FDM and OFDM, for communication signals transmitted by one or more wireless devices (e.g., any or all of eNBs 105 and/or UEs 115). For example, operation according to embodiments may provide for use of a waveform design that minimizes PAPR, such as SC-FDM, as well as a waveform design that provides higher spectral efficiency, such as OFDM, for scenarios that are not power-limited and the higher PAPR is acceptable.

Exemplary implementations of adaptive waveform selection are described herein with reference to the use of high frequency carriers, such as millimeter-wave carriers. Yet it should be appreciated that adaptive waveform selection provided according to the concepts herein may additionally or alternatively be utilized with respect to devices communicating using other frequencies, such as sub-6 GHz frequencies.

In operation according to aspects of the disclosure, one or more wireless devices (e.g., any or all of eNBs 105 and/or UEs 115) communicating via a wireless link (e.g., communication links 125) operate to analyze attributes of the wireless communications (e.g., parameters of a scheduling grant) and select an appropriate waveform from a plurality of possible waveforms (e.g., SC-FDM, OFDM, etc.) for the wireless communications. For example, logic of controller/processor 240 and/or controller/processor 280 may operate to analyze various attributes associated with wireless communications conducted by a respective one of eNB 105 and UE 115 to select a waveform from a plurality of waveforms and control corresponding ones of modulators 232a through 232t (eNB 105) and/or modulators 252a through 252r (UE 115) to process a respective signal stream for the selected waveform (e.g., SC-FDM, OFDM, etc.). Attributes associated with the wireless communications analyzed according to embodiments may include one or more of the number of component carriers on which data is transmitted and/or on each carrier, the modulation order, number of spatial layers, and/or spectral efficiency of the modulation-and-coding format for the transmission, associated with the wireless link transmissions. In operation according to some implementations the control logic may, for example, select OFDM in scenarios of high SNR (e.g., SNR determined to meet or exceed a threshold allowing high order modulation, such as 64 QAM, SNR of 10 or 15 dB), more than a few carriers (e.g., at least a threshold number of carriers, such as 2 or more carriers or 3 or more carriers, as may be determined based on one or more scheduling grants that are signaled on one or more carriers), and/or MIMO (multiple spatial layers). Conversely, the control logic of some implementations may select SC-FDM in scenarios of few carriers (e.g., less than a threshold number of carriers, such as 1 carrier or 2 carriers), low SNR (e.g., at or below a threshold SNR requiring low order modulation, such as less than 64 QAM, or SNR less than 10 or 15 dB), and/or single-layer transmission.

Embodiments may initiate use of a selected waveform without explicitly signaling a corresponding wireless device of the communication link. Signaling of selection of a waveform for data transmission may be provided implicitly according to some implementations, such as by the selection of a particular waveform for data transmission being determined by a receiving device based implicitly on the various attributes associated with the wireless communications. For example, particular attribute values and/or combinations of attribute values (e.g., different combinations of grant parameters) may each be mapped to an appropriate one of the possible waveform selections of a plurality of waveform selections. Accordingly, the attributes or combinations of attributes for one or more grant parameters analyzed according to embodiments may be compared to a database or other information providing a mapping of attribute values and/or combinations of attribute values to particular waveform selections in order to provide waveform selection information (e.g., identify a particular waveform for use in view of the analyzed grant parameters via the mapping between attribute values and waveform selections). An example of a grant parameter attribute value to waveform selection information mapping is shown in the table below. It should be appreciated that the particular values illustrated for the exemplary waveform selections in the table below are merely examples and embodiments may utilize different values, different waveform selections, and/or different parameter attributes. Moreover, although the table below shows a one-to-one mapping of parameter attributes to waveform selection for simplicity, it should be appreciated that various combinations of parameter values (e.g., a combination of SNR value and number of carriers having particular values for selection of a particular waveform) may be utilized in a mapping implemented according to embodiments herein. The mapping as may be utilized according to embodiments may be fixed (e.g., established by specification or an adopted standard). However, the mapping may be dynamic (e.g., signaled semi-statically in system information messages or in configuration messages, wherein the mapping of parameters to waveforms can vary semi-statically), according to some embodiments.

| Scheduling Grant Parameter Attribute | Waveform Selection |
|---|---|
| SNR ≥ 10 dB | OFDM |
| SNR < 10 dB | SC-FDM |
| Number of Carriers > 2 | OFDM |
| Number of Carriers ≤ 2 | SC-FDM |
| MIMO | OFDM |
| Single layer transmission | SC-FDM |

Additionally or alternatively, implementations herein may provide for explicit signaling in association with the adaptive waveform selection. Such explicit signaling may, for example, be semi-static (e.g., based on system information messages or higher layer reconfiguration messages) or more dynamic (e.g., based on a waveform-selection field in the scheduling grants). For example, explicit signaling of selection of a waveform for data transmission may be provided using a field in the scheduling grant for that transmission.

In operation according to some implementations, certain combinations of waveform selection and other grant parameters may be designated as invalid, and thus the corresponding grant may be rejected. Such invalid combinations of waveform selection and other parameters may be based on one or more scheduling grants for transmission on one or more component carriers, and the grants themselves may be received on one or more component carriers. For example, a combination of waveform selection and grant parameters may be designated as invalid if scheduling grants received for transmission on two component carriers indicate two different types of waveforms and both grants may be rejected. As another example of a combination of waveform selection and grant parameters designated as invalid according to embodiments, a high modulation order such as 256QAM could be enforced to always use a particular waveform such as OFDM, and thus grants assigning such a high modulation order to another waveform (e.g., SC-FDM) may be rejected.

It should be appreciated that adaptive waveform selection in accordance with the concepts herein may be applied to downlink waveform selection, uplink waveform selection, or both downlink and uplink waveform selection. On a downlink provided by a eNB or other base station serving a plurality of devices (e.g., multiple UEs) all the frequency division multiplexed transmissions may be passed through a common PA at the base station and thus an implementation herein may use the same waveform for each of these transmissions. In operation according to an implementation in accordance with this example, downlink broadcast control channels may be time division multiplexed with a data channel in order to allow dynamic waveform selection for downlink data channel. The downlink scheduler may be optimized such that wireless devices for which the same downlink waveform is selected or otherwise preferred are scheduled together by FDM. In operation according to some implementations, downlink scheduling grants may be transmitted using a fixed waveform, such as to avoid the complexity of multiple waveform hypothesis decoding of the grants at the corresponding wireless device. These grants may, for example, be carried on a control channel (e.g., PDCCH in LTE) that is time division multiplexed with downlink data.

Adaptive waveform selection may not only be utilized with respect to an established communication link, but additionally or alternatively be utilized with respect to initially establishing a communication link. As an example of the use of adaptive waveform selection when initially establishing a communication link, operation will be described with reference to a random access procedure (e.g., a random access procedure for a random access channel (RACH), such as the RACH channel specified in LTE), wherein it may be beneficial to use the most efficient waveform for communication according to the concepts herein. In such a random access procedure, UE 115 may transmit a message (e.g., a physical random access channel (PRACH) sequence) to eNB 105, UE 115 may receive a response (Msg2) from eNB 105, UE 115 then may transmit another message (Msg3) to eNB 105, and thereafter UE 115 may receive an additional message (Msg4) from eNB 105 to complete the RACH procedure.

In operation of adaptive waveform selection of embodiments during the foregoing random access procedure, the waveform to be used for transmission of the message to initiate the random access procedure (e.g., the aforementioned PRACH sequence) may be fixed, such as to use the same waveform (e.g., SC-FDM) for all such messages. Alternatively, the waveform used for transmitting this message may be adaptively changed, such as may be determined by a receiver implementing a multiple waveform analysis technique as described below. Similarly, the waveform to be used for uplink transmission (Msg3, or message-3 in LTE) that is made after receiving the random access response (Msg2, or RAR, or message-2 in LTE) may be fixed or may be determined dynamically, such as based on one or more attributes of the wireless communications. For example, the waveform to be used for the uplink transmission may be dynamically selected based upon system information present in broadcast downlink messages (e.g., system information blocks (SIBs)), information in a response message (e.g., Msg2 or RAR message), the PRACH sequence used for initial access (e.g., each PRACH sequence may be associated with a particular waveform, whereby different PRACH sequences may be utilized with respect to OFDM, SC-FDM, etc.), wireless device measurements (e.g., UE measurements of path-loss), and/or the like.

It should be appreciated that measurements made by one wireless device (e.g., UE 115) for selection of a waveform may not be known to another wireless device (e.g., eNB 105). Accordingly, if waveform selection by a first wireless device is based on parameters not known to second wireless device, this second wireless device may operate to attempt to receive a message transmission (e.g., Msg3 or message-3) separately assuming each possible waveform choice. Such a multiple waveform analysis technique, wherein processing of the receive message may be performed a plurality of times before the appropriate waveform is identified, may be suitable for some configurations of wireless devices (e.g., base stations having robust resources, connection to power mains, etc.) while being unsuitable for other configurations of wireless devices (e.g., UEs having more limited resources, operating on battery power, etc.). Accordingly, although operation with respect to one link direction (e.g., uplink) may provide for determining the waveform through multiple attempts to receive the message, operation with respect to the other link direction (e.g., downlink) may provide for determining the waveform without invoking such multiple attempts to receive the message (e.g., by using a fixed waveform, by providing explicit signaling regarding the waveform, etc.). For example, when a downlink data channel uses adaptive waveform selection based on an explicit indication in downlink scheduling grant, the downlink control channels carrying the scheduling grants and broadcast information may be time division multiplexed with downlink data channel and use a fixed waveform. As another example, when a downlink data channel uses adaptive waveform selection based on an explicit indication in downlink scheduling grant, the random access response (e.g., Msg2 or RAR) and the additional message (e.g., Msg4 or message-4 in LTE) may use a fixed waveform.

Figure 3:
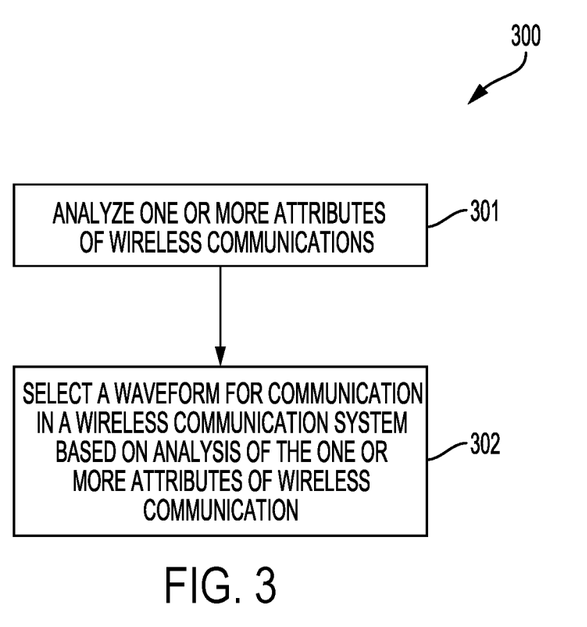
FIG. 3 is a flow diagram showing operation in accordance with some embodiments of the present disclosure.

Referring now to FIG. 3, flow 300 illustrating operation of an adaptive waveform selection technique implemented according to aspects of the present disclosure is shown. The processes of flow 300 may, for example, be implemented by adaptive waveform selection logic of eNB 105 and/or UE 115 (e.g., logic of controller/processor 240 and/or controller/processor 280). Adaptive waveform selection logic (or some portion thereof) of embodiments may, for example, be provided as one or more instruction sets (e.g., software codes and/or firmware codes, such as may be stored by memory 242 and/or memory 282) executed by controller/processor 240 and/or controller processor 280 to form logic circuits providing operation as described herein. Additionally or alternatively, adaptive waveform selection logic (or some portion thereof) of embodiments may be provided as circuits of one or more hardware devices or electronics components (e.g., digital signal processor (DSP), application specific integrated circuit (ASIC), field programmable gate array (FPGA), discrete gate or transistor logic, etc.) to form logic circuits providing operation as described herein.

At block 301 of the illustrated implementation, one or more attributes of wireless communications are analyzed by adaptive waveform selection logic (e.g., adaptive waveform selection logic implemented by controller/processor 240 of eNB 105 and/or adaptive waveform selection logic implemented by controller/processor 280 of UE 115) of embodiments. For example, parameters of a scheduling grant, such as may include one or more of the number of component carriers on which data is transmitted and/or on each carrier, the modulation order, number of spatial layers, and/or spectral efficiency of the modulation-and-coding format for the transmission, associated with the wireless link transmissions. Additionally or alternatively, explicit signaling regarding a waveform for the wireless communication may be analyzed. For example, system information messages or higher layer reconfiguration messages may be analyzed for explicit waveform signaling. Similarly, a waveform-selection field in the wireless communication scheduling grant may be analyzed for explicit waveform signaling.

At block 302 of the illustrated implementation, a waveform for communication is selected from a plurality of waveforms by adaptive waveform selection logic (e.g., adaptive waveform selection logic implemented by controller/processor 240 of eNB 105 and/or adaptive waveform selection logic implemented by controller/processor 280 of UE 115) of embodiments based on information provided by the analysis of block 301. For example, an appropriate waveform may be selected from a plurality of possible waveforms that include a SC-FDM waveform design and an OFDM waveform design. Thereafter, the selected waveform may be utilized in wireless communications performed according to the wireless communication scheduling grant.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 2 and 3 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for adaptive waveform selection for wireless communication in a wireless communication system, the method comprising:

determining, by a wireless device of a wireless communication system, a waveform to use for at least one uplink transmission associated with a random access channel (RACH) procedure which comprises two messages or four messages, wherein the determining of the waveform is based on a system information block (SIB), a first message of the RACH procedure, a second message of the RACH procedure, a measurement, or a combination thereof, and wherein the waveform is determined from a plurality of waveforms including a single-carrier frequency division multiplexing (SC-FDM) waveform and an orthogonal frequency division multiplexing (OFDM) waveform; and transmitting a message corresponding to the RACH procedure based on the determined waveform.

2. The method of claim 1, wherein the waveform includes a single-carrier frequency division multiplexing (SC-FDM) waveform.

3. The method of claim 1, wherein the waveform includes an orthogonal frequency division multiplexing (OFDM) waveform.

4. An apparatus for adaptive waveform selection for wireless communication in a wireless communication system, the apparatus comprising:

at least one processor;
a memory coupled to the at least one processor; and
a communication interface coupled to the at least one processor, wherein the at least one processor is configured to:
determine, based on a system information block (SIB) included in a received broadcast message and from a plurality of waveforms including a single-carrier frequency division multiplexing (SC-FDM) waveform and an orthogonal frequency division multiplexing (OFDM) waveform, a waveform to use for at least one uplink transmission associated with a random access channel (RACH) procedure; and
transmit a message, via a wireless communication medium, the message corresponding to the RACH procedure based on the determined waveform.

5. The apparatus of claim 4, wherein the waveform is determined based on an attribute associated with the RACH procedure.

6. The apparatus of claim 4, wherein the waveform is determined based on a first message of the RACH procedure.

7. A method for wireless communication performed by a wireless device, the method comprising:

selecting, based on a system information block (SIB) included in a received broadcast message, a waveform from a plurality of waveforms; and transmitting, based on the waveform, a message corresponding to a random access channel (RACH) procedure, wherein the plurality of waveforms include a single-carrier frequency division multiplexing (SC-FDM) waveform, an orthogonal frequency division multiplexing (OFDM) waveform, or a combination thereof.

8. The method of claim 7, wherein the waveform includes the OFDM waveform.

9. The method of claim 7, wherein the waveform is selected without the wireless device having received an explicit parameter configuration of a waveform selection in the SIB.

10. The method of claim 7, wherein:
the RACH procedure includes a two message RACH procedure or a four message RACH procedure, and
selecting the waveform includes an adaptive waveform selection of the waveform from the plurality of waveforms.

11. The method of claim 7, further comprising determining the waveform to use for at least one uplink transmission associated with the RACH procedure, wherein the RACH procedure includes a two message RACH procedure.

12. The method of claim 11, wherein determining the waveform is based on a first message of the RACH procedure.

13. The method of claim 12, wherein the first message includes a physical random access channel (PRACH) sequence, and a second message includes a random access response (RAR).

14. The method of claim 12, wherein the waveform is determined based on a path-loss measurement.

15. The method of claim 7, further comprising:
receiving a scheduling grant message; and
wherein selecting the waveform is further based on the scheduling grant message.

16. The apparatus of claim 4, further comprising:
communication circuitry configured to wirelessly transmit the message.

17. The apparatus of claim 4, wherein the at least one processor is further configured to receive the received broadcast message that includes the SIB.

18. The method of claim 7, further comprising:
receiving the received broadcast message that includes the SIB.

* * * * *